UNITED STATES PATENT OFFICE.

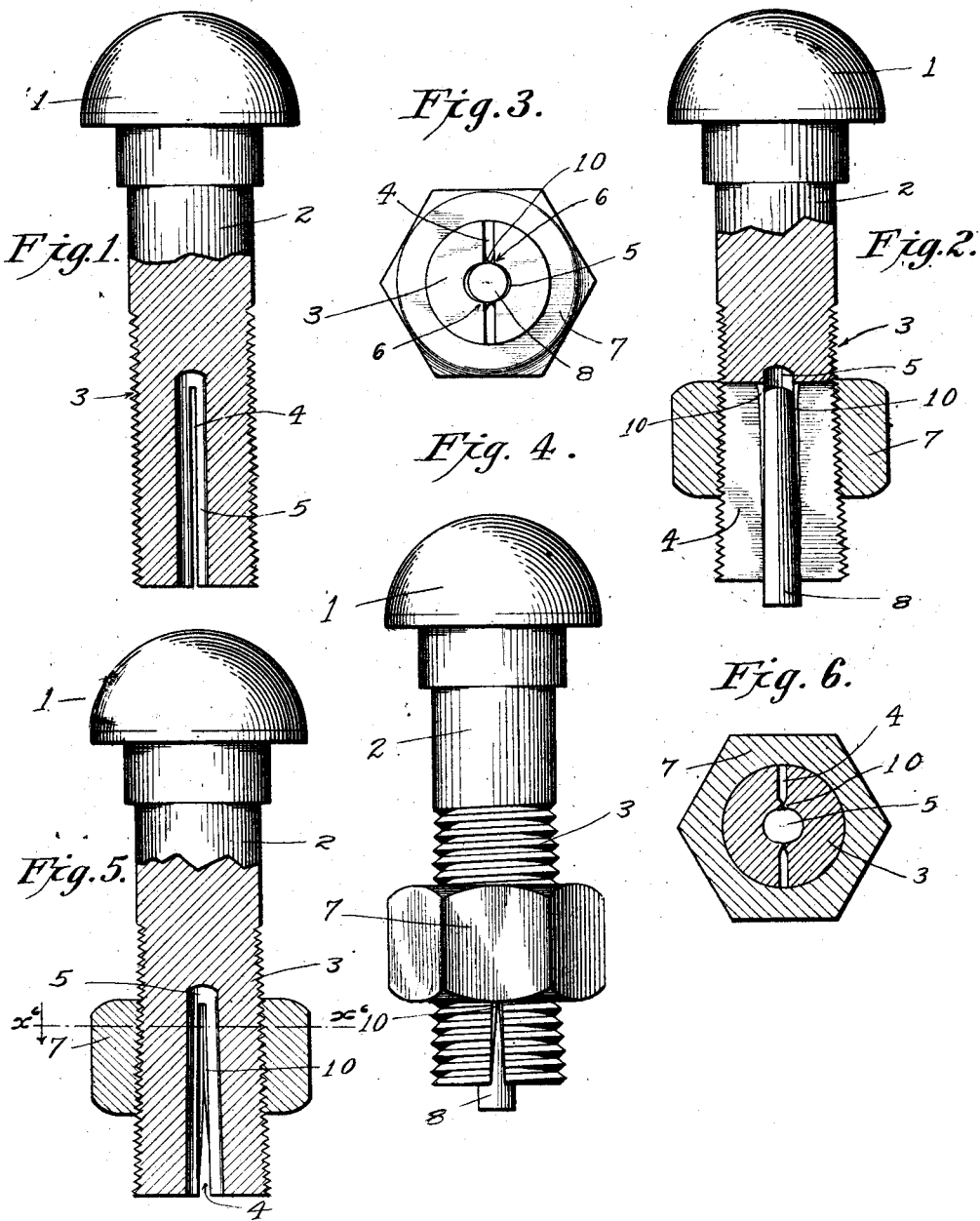

ROBERT T. AINSLIE, OF LOS ANGELES, CALIFORNIA.

LOCK NUT AND BOLT.

1,031,978.  Specification of Letters Patent.  Patented July 9, 1912.

Application filed December 7, 1910. Serial No. 596,123.

*To all whom it may concern:*

Be it known that I, ROBERT T. AINSLIE, a citizen of the United States, residing at Los Angeles, in the county of Los Angeles and State of California, have invented a new and useful Lock Nut and Bolt, of which the following is a specification.

The object of this invention is to provide simple and effective means for locking a nut onto its bolt so that it can not be withdrawn without cutting the parts.

Other objects of the invention will appear hereinafter.

The accompanying drawings illustrate the invention, and referring thereto: Figure 1 is a longitudinal section of the bolt, partly in elevation. Fig. 2 is a vertical section, partly in elevation of the bolt, with the nut in position thereon and locked thereto. Fig. 3 is an inverted plan of Fig. 2. Fig. 4 is a side elevation of the bolt with the nut thereon. Fig. 5 is a sectional view at right angles to Fig. 2 with the locking pin removed. Fig. 6 is a section on line $x^6$—$x^6$ in Fig. 5.

The bolt which is provided with head 1, shank 2, and screw-threaded portion 3, is formed with a longitudinal slot 4 extending from the outer end of the bolt, inwardly a sufficient distance to extend within the nut in the ordinary operative position of the nut. Said slot 4 extends diametrically across the bolt and a bore or cylindrical channel 5 is formed axially in the bolt, said bore extending from the outer end of the bolt to about the same depth as the slot 4. The bore 5 divides the slot 4 into two portions which open into said bore 5 and form sharp corners or edges 6 where the slots and bore meet. The nut 7 may be of any usual form adapted to work on the screw-threaded portion 3 of the bolt, and is secured or locked to the bolt by means of a key, consisting of a tapered pin 8. The inner or smaller end of said tapered pin is of a size just sufficient to enable it to enter the cylindrical bore 5, and the outer end of said pin is somewhat larger than the bore so as to expand the bolt when the pin is driven into said bore.

In using the bolt, the nut 7 is screwed into place and the pin 8 is then inserted in the bore 5 and driven in, thereby expanding the bolt so that it is driven outwardly against the nut and the threads are tightened on one another, the nut being then held from withdrawal from the bolt by friction due to tightness of contact and by the fact that the bolt itself is outwardly expanded as shown in Figs. 2, 4 and 5. This expansion or flare of the bolt toward the outer end is insured not only by the presence of the pin, but by the formation of a fin or upset portion of the metal at the edges 6 of the bolt where the inner edge of the pin deforms or upsets said edges 6 in driving the pin into place, the metal of the bolt being in this operation spread or forced into the slot 4 in the manner indicated at 10 in Figs. 2, 4, 5 and 6. It is essential to this operation that the pin should engage the bore at the end of the pin on entering the bore so as to produce the deforming action. It will be noted that even when the tapered pin is removed as shown in Fig. 5, the nut is securely locked by reason of the fact that the deformation or intrusion of the metal into the slots forms an obstruction preventing the outwardly flaring portions of the bolt from approaching one another, thereby maintaining the outward flare of the bolt and preventing the nut from being withdrawn, and the pin may therefore be used merely as an expanding means for the bolt, being then withdrawn, leaving the nut locked to the bolt by the deformation of the bolt as stated.

What I claim is:

1. A bolt having a threaded exterior and provided with a transverse slot extending inwardly from its outer end and having a cylindrical axial bore extending inwardly from its outer end, such slot and bore extending into a nut when a nut is screwed upon the bolt, a nut screwed onto said bolt, and a tapered pin driven into said bore, the larger diameter of said tapered pin being greater than the diameter of said cylindrical bore, the outer end of the bolt being expanded within the nut by said pin.

2. A bolt having a threaded exterior and provided with a transverse slot extending inwardly from its outer end and having a cylindrical axial bore, both said slot and bore extending inwardly from the outer end to a distance within a nut, a nut screwed onto said bolt, and a tapered pin driven into said bore, the larger diameter of said tapered pin being greater than the diameter of said cylindrical bore, the outer end of the bolt being expanded within the nut by said pin, and the corners of the bolt, where the slots therein meet the bore, being spread and deformed so as to extend into the slots.

3. A bolt provided with a transverse slot, extending inwardly from its outer end and having a cylindrical axial bore extending inwardly from its outer end, a nut screwing on said bolt, the outer end of the bolt being expanded within the nut, and the corners of the bolt, where the slots therein meet the bore, being spread and deformed so as to extend into the slots.

In testimony whereof, I have hereunto set my hand at Los Angeles, California this 29th day of November, 1910.

ROBERT T. AINSLIE.

In presence of—
A. P. KNIGHT,
FRANK L. A. GRAHAM.